(12) United States Patent
Reddy et al.

(10) Patent No.: US 11,960,794 B2
(45) Date of Patent: *Apr. 16, 2024

(54) SEAMLESS THREE-DIMENSIONAL DESIGN COLLABORATION

(71) Applicant: Autodesk, Inc., San Francisco, CA (US)

(72) Inventors: Shatakirti Reddy, Secunderabad (IN); Nirupam Nirupam, Toronto (CA); Pradeep Kumar, Artarmon (AU); Sandip Mansukhlal Chauhan, Gujarat (IN)

(73) Assignee: Autodesk, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,121

(22) Filed: Nov. 22, 2022

(65) Prior Publication Data
US 2023/0128446 A1 Apr. 27, 2023

Related U.S. Application Data

(63) Continuation of application No. 16/415,347, filed on May 17, 2019, now Pat. No. 11,507,709.

(51) Int. Cl.
*G06F 30/00* (2020.01)
*G06F 40/205* (2020.01)
(Continued)

(52) U.S. Cl.
CPC .............. *G06F 30/00* (2020.01); *G06F 40/30* (2020.01); *G06F 40/205* (2020.01);
(Continued)

(58) Field of Classification Search
CPC ...... G06F 30/00; G06F 40/30; G06F 2111/02; G06F 2111/20; G06F 40/284; G06F 40/205
See application file for complete search history.

(56) References Cited

U.S. PATENT DOCUMENTS 5,728,023 A 3/1998 Green et al.
8,943,408 B2 * 1/2015 Horns .................. G06F 40/169
715/780

(Continued)

OTHER PUBLICATIONS

"Product Lifecycle Management (PLM)", Autodesk, pp. 1-10, https://www.autodesk.com/content/product-lifecycle-management, as downloaded Apr. 1, 2019.

*Primary Examiner* — Michael W Ayers
*Assistant Examiner* — Phuong N Hoang
(74) *Attorney, Agent, or Firm* — Gates & Cooper LLP

(57) ABSTRACT

A method, system, and article of manufacture provide for multi-user collaboration on a three-dimensional (3D) design. The 3D design is acquired in a computer-aided design (CAD) application. A commenting process for a comment to be associated with a selected part of the 3D design is activated. Textual user input for the comment is dynamically processed as the comment is received. The processing recognizes that the text relates to creating or modifying the selected part, retrieves a list of alternative parts (based on similarities between the alternative parts and the selected part), and displays a graphic representation of an alternative part. An alternative part is selected and inserted in the comment as a proposed replacement part. The comment including the proposed replacement part is provided to another user.

16 Claims, 8 Drawing Sheets

(51) Int. Cl.
  *G06F 40/284*     (2020.01)
  *G06F 40/30*      (2020.01)
  *G06F 111/02*     (2020.01)
  *G06F 111/20*     (2020.01)

(52) U.S. Cl.
  CPC ........ *G06F 40/284* (2020.01); *G06F 2111/02* (2020.01); *G06F 2111/20* (2020.01)

(56) References Cited

U.S. PATENT DOCUMENTS

2014/0074865 A1   3/2014  Zobrist et al.
2014/0310132 A1* 10/2014  Culver ................ G06Q 10/101
                                                           705/26.81
2014/0380191 A1* 12/2014  Rotbaein ............... H04L 65/403
                                                           715/753
2018/0122138 A1   5/2018  Piya et al.
2019/0188643 A1   6/2019  Marothiya et al.
2019/0340198 A1  11/2019  Hamada et al.
2020/0169465 A1   5/2020  Stelmar Netto et al.

\* cited by examiner

SEAMLESS THREE-DIMENSIONAL DESIGN COLLABORATION

CROSS-REFERENCE TO RELATED APPLICATIONS

This application is a continuation under 35 U.S.C. § 120 of application Ser. No. 16/415,347, filed on May 17, 2019 (now U.S. Pat. No. 11,507,709 issued on Nov. 22, 2022) with inventor(s) Shatakirti Reddy, Nirupam Nirupam, Pradeep Kumar, and Sandip Mansukhlal Chauhan, entitled "Seamless Three-Dimensional Design Collaboration," which application is incorporated by reference herein.

BACKGROUND OF THE INVENTION

1. Field of the Invention

The present invention relates generally to three-dimensional (3D) design applications, and in particular, to a method, apparatus, system, and article of manufacture for enabling a multi-user collaboration on 3D designs.

2. Description of the Related Art

During a product development and manufacturing process, collaboration has become a key requirement towards a cost-effective solution to any industry. In this era, collaboration happens across geographies just to add more complexity to an already complex system. Unlike the software industry, with gigantic construction sites, manufacturing industry needs stricter and efficient review workflows to keep the cost from growing exponentially. For example, prior art computer-aided design (CAD) managers and industry users must rely on poor text bookkeeping techniques and text-based searches for look up and to suggest or provide comments. Accordingly, the prior art review process currently only permits text comments and markup. In this regard, there is no way to leverage information about: the geometry of design parts; the existing inventory; or industry standards to support the recommendations in the comment. Further, prior art commenting systems fail to provide a mechanism to log tickets in project management workflow tools. To better understand the problems of the prior art a description of a product lifecycle and its inefficiencies may be useful.

In this age of the extended enterprise, expansion of the Internet provides the infrastructure by which information can be simultaneously available to all those involved in the product lifecycle. Various computer aided tools attempt to provide the collaboration between different phases of a product lifecycle. FIG. 1 illustrates the different phases of a product lifecycle. Each phase 102-110 in the product lifecycle 100 is an iterative process before a user passes the results to the next phase 102-110. The phases include engineering design 102, production 104, sale 106, recycle 108, and project management 110. Any defect carried between phases 102-110 or inefficient process within a phase 102-110 has an impact on the overall lifecycle efficiency and hence cost.

In view of the above, it may be noted that the prior art fails to provide an efficient workflow (e.g., in terms of time, collaboration, and cost) in and between various phases of a product lifecycle.

SUMMARY OF THE INVENTION

Embodiments of the invention enable a multi-user workflow collaboration on three-dimensional designs—specifically in the engineering design phase of a product lifecycle. Review cycles are expedited/sped up compared to prior art implementations by automatically recommending cost-effective replacement parts in a design during the review itself. When a reviewer is adding a comment to a design, inline information specific to the context of the part being commented on are provided (e.g., using machine learning inputs from a design graph). Since this intelligence is integrated into the commenting task flow, the overall efficacy of the review process is enhanced.

Further, to expedite review cycles, reviewed tasks may be identified and created in project/workflow management systems (e.g., the PLM workflow system, WORFKLOWMAX workflow system, etc.). In addition, review cycles may be expedited based on a workflow that provides the ability to understand and validate required modifications from a stakeholder's comments and automatically incorporating such comments into the design/design preview.

Embodiments of the invention further enable cost effective manufacturing by suggesting/utilizing industry wide standards in a design, suggesting/utilizing the re-use of parts based on inventory, suggesting/utilizing the most used similar parts that are widely used within a project/organization, and determining the compatibility of suggested parts based on pre-simulation/simulation tests.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Exemplary Workflow/Logical Flow

Figure 1:
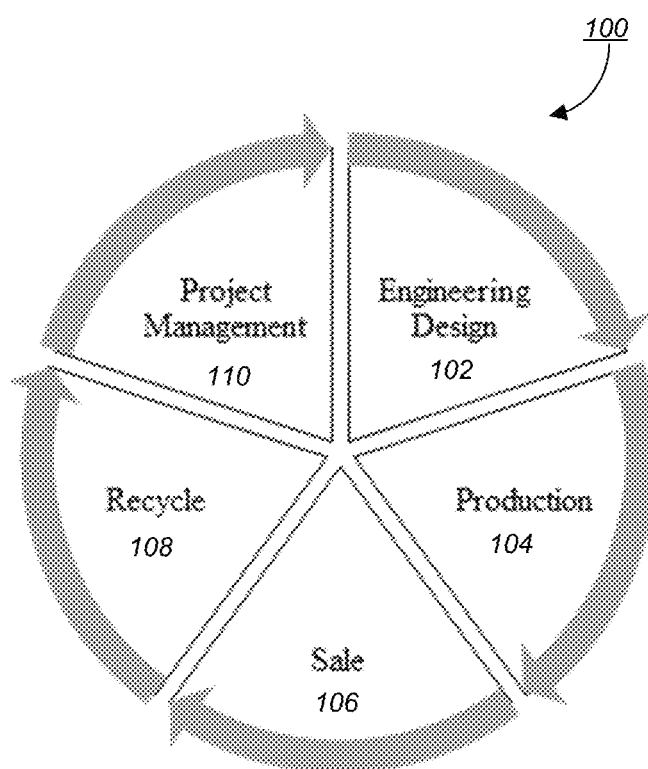
FIG. 1 illustrates different phases of a product lifecycle.
Figure 2:
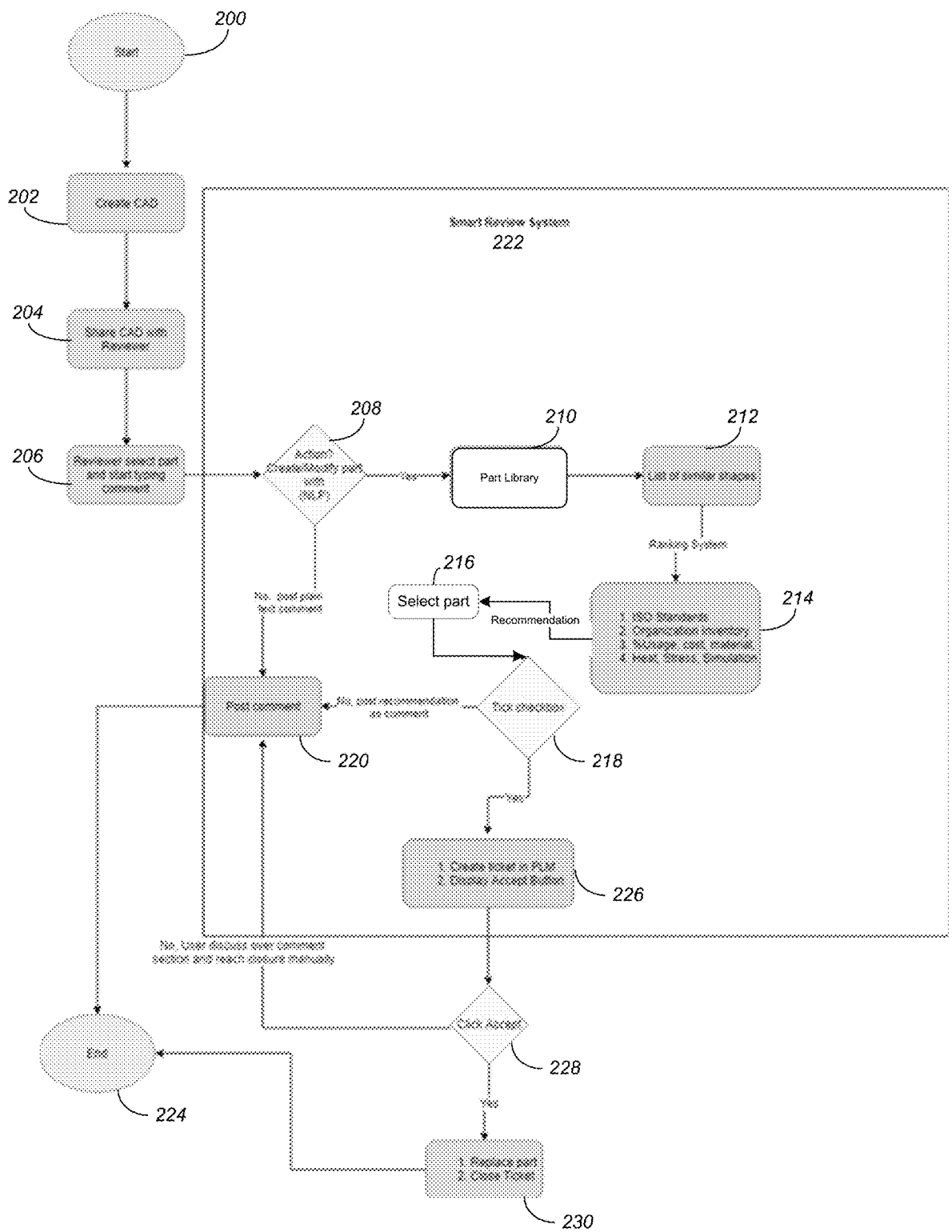
FIG. 2 illustrates the logical flow for enabling/providing multi-user collaboration on a three-dimensional (3D) design in accordance with one or more embodiments of the invention.

FIG. 2 illustrates the logical flow for enabling/providing multi-user collaboration on a three-dimensional (3D) design in accordance with one or more embodiments of the invention. The steps of FIG. 2 will be described with reference to FIGS. 3-8 that illustrate exemplary screen shots that demonstrate the workflow.

Figure 3:
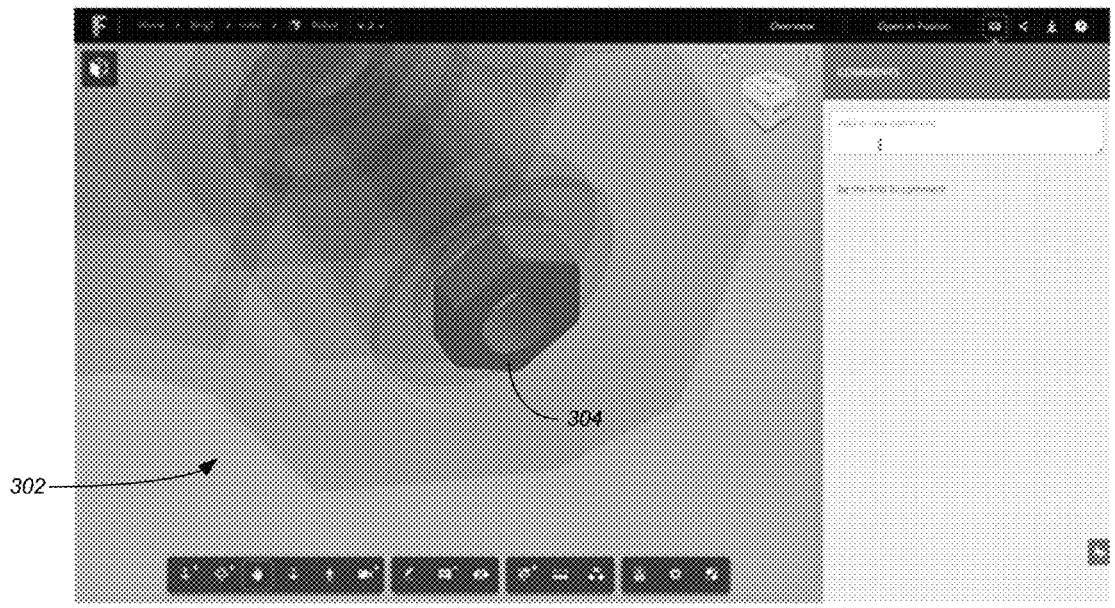
FIG. 3 illustrates a model view of an acquired 3D design in accordance with one or more embodiments of the invention.

The process starts at 200 and a computer-aided design (CAD) (e.g., a 3D design) is created/acquired in a CAD application at step 202. At step 204, the CAD design is shared (e.g., by a design producer) with a reviewer. In this regard, the design producer, the reviewer, and other reviewers/editors of the design are referred to herein as collaborating users. FIG. 3 illustrates a model view of an acquired 3D design 302 in accordance with one or more embodiments of the invention. As illustrated, the reviewer is currently viewing the 3D design 302. The reviewer could be anyone assigned in a company.

Figure 4:
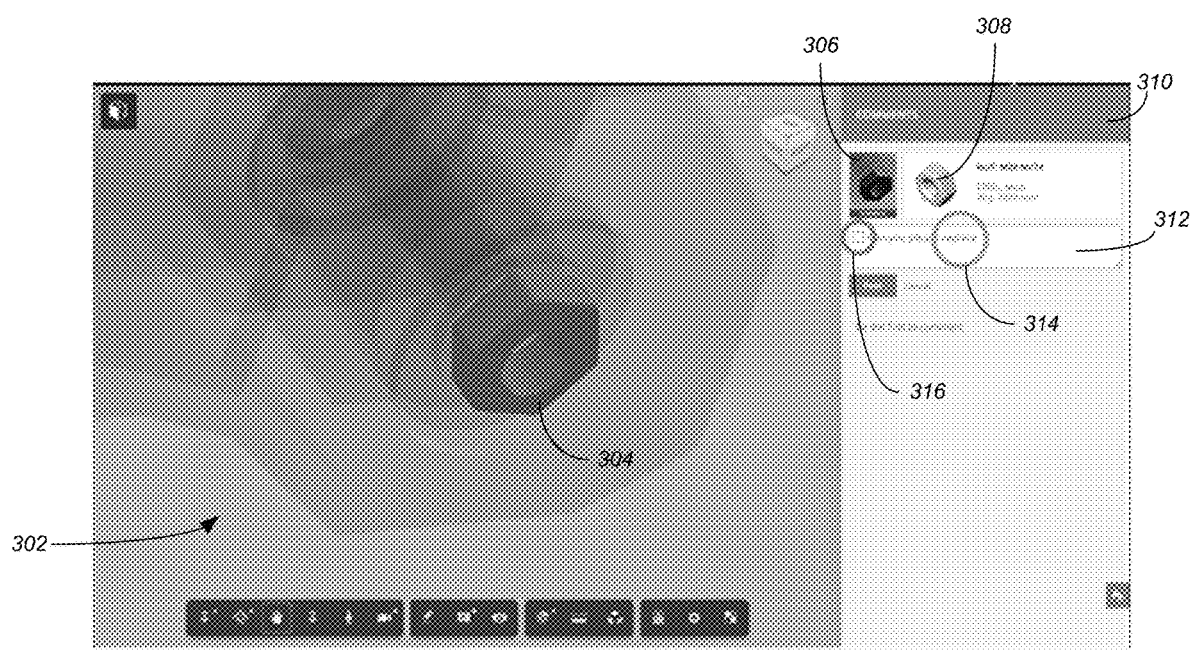
FIG. 4 illustrates a model view once a reviewer has selected a part in accordance with one or more embodiments of the invention.

At step 206, referring to FIG. 4, once a reviewer selects a part 304, a small icon 306 representing the selected part 304 may be displayed adjacent to a graphic representation 308 of the selected part (e.g., the graphic representation 308 may be from the part manufacturer such as a catalog) within a commenting window 310 (e.g., to reflect the current part that the user has selected and is commenting on). In this regard, the reviewer invokes/activates a commenting process by/and selects a part 304. The reviewer may then commence typing a comment (e.g., in comment dialog box 312). In other words, upon the reviewer analyzing the design 302, the reviewer may start suggesting changes on one or more parts 304 of the design 302. To start such suggestions, the reviewer may insert text comments into the text commenting dialog box 312 of comments area/window 310. Stated another way, the reviewer may activate a commenting process for a comment to be associated with a selected part 304 of the 3D design 302.

Referring again to FIG. 2, steps 208-220 and 226 are performed by a smart review system 222 of embodiments of the invention. The smart review system 222 dynamically process user input for the comment as it is received. Such user input may consist of text input into comment dialog box 312.

In step 208, the system dynamically analyzes/parses the comment to identify an action to create/modify the selected part 302. Such an analysis may search for any known pattern of text such as change, replace, etc. Further, the analysis may utilize natural language processing (NLP). For example, a verb library may be maintained and mapped to corresponding actions. The dynamic processing recognizes that the text being inserted relates to creating or modifying the selected part. FIG. 4 illustrates the term "replace" 314 has been inserted by the reviewer in comment dialog box 312 and the system has recognized that the term "replace" 310 is associated with the creation/modification action for the selected part 304.

Once the pattern/term is recognized, the system 222 analyzes various aspects of the part/parts 304 of the design 302 for further action. In this regard, in step 210, the system 222 accesses a database/library of parts (e.g., the AUTODESK KNOWLEDGE GRAPH database) and generates a list of similar shapes 212. Specifically, the system 222 dynamically retrieves a list of alternative parts/shapes, where the parts/list is based on similarities between the selected part 204 and the alternative parts in the part library 210.

In one or more embodiments of the invention, an optional ranking system may be utilized to order/rank the list of parts 212. The ranking system may rank the list of similar shapes/parts 212 based on various parameters/conditions. For example, the ranking system may rank the list of parts 212 based on:
 whether a part is from a standard library (e.g., of a particular organization, international organization for standardization [ISO] standards, or otherwise);
 whether a part is in an organization's inventory;
 whether a part is provided by an approved vendor by ratings;
 how well a part fits the design (wherein fit includes validation based on geometry, material, simulation results, etc.); and
 production cost of the part (e.g., does the part fit a defined/specified budget limit, etc.).

Figure 9:
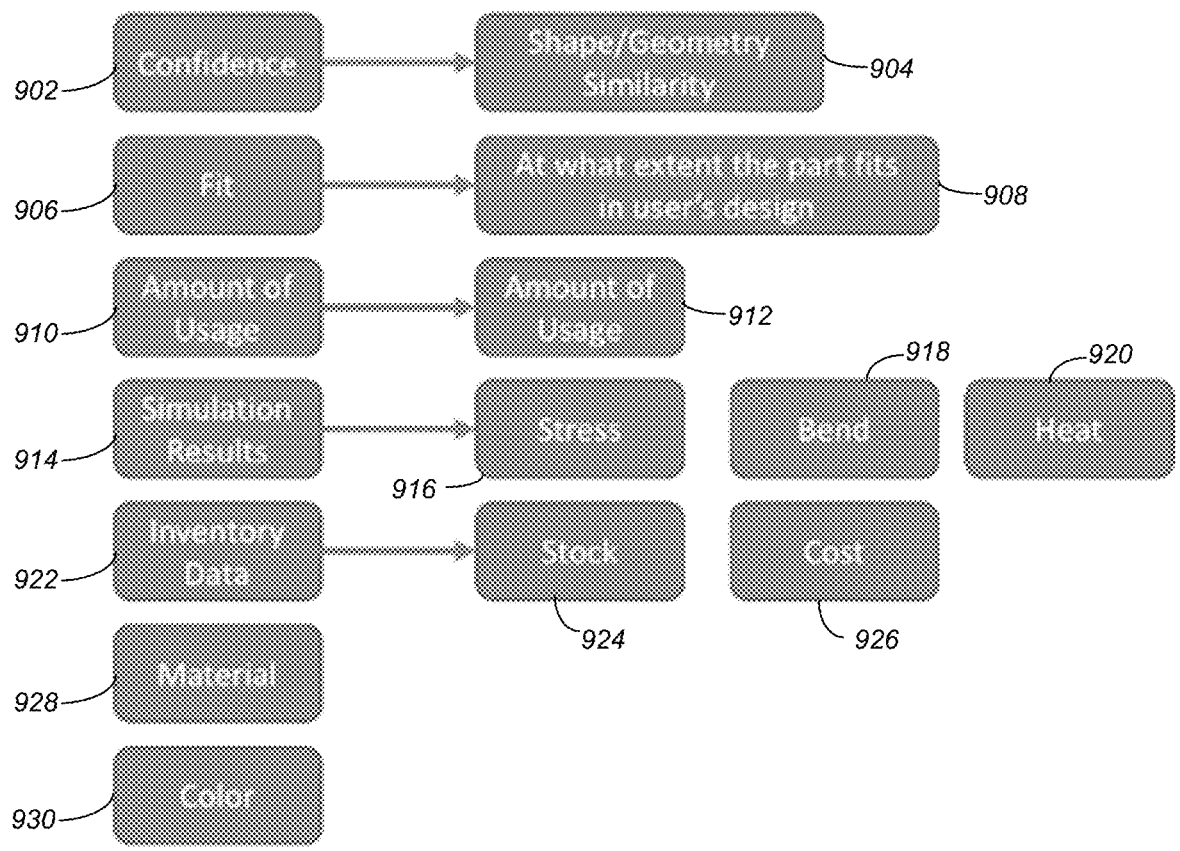
FIG. 9 illustrates potential parameters that may be utilized to rank a list of parts in accordance with one or more embodiments of the invention.

In addition to the parameters described above, FIG. 9 illustrates potential parameters that may be utilized to rank the list of parts 212. Further, embodiments of the invention may rank the parts in the list of parts 212 in the listed order from top to bottom as set forth in FIG. 9.

Confidence factor 902 reflects a confidence that the alternative part in the list of parts 212 has a similarity 904 with respect to shape/geometry of the selected part 204 (i.e., the parts in the list of parts 212 may be ordered based on shape/geometric similarity 902 with the selected part 204).

Fit factor 906 reflects the extent to which the alternative part in the list of parts 212 fits into the user's design 302.

Amount of usage factor 910 reflects the amount/percentage of usage 912 of the alternative part in the past by that user (e.g., user specific based on prior selections) and/or other users (e.g., product specific across multiple/all users), and/or the amount of usage of the alternative part in the current design (e.g., so that the same part can be reused).

Simulation results factor 914 reflects results of a simulation using the alternative part when the alternative part is exposed to stress 916, bend 918, and/or heat 920. Alternatively, the stress 916, bend 918, and heat 920 attributes may reflect properties of the alternative part as determined by the alternative part manufacturer (e.g., as compared to requirements/preferences for the design 302).

Inventor data factor 922 reflects an analysis of the (current) inventory of the alternative part manufacturer and/or product designer based on what items are in stock 924 and/or the cost 926 of such items/parts.

Material factor 928 reflects an analysis of the material of the alternative part (e.g., as compared to requirements/preferences for the design 302).

Color factor 930 reflects a required/preferred color for the alternative part.

All or a subset of the factors 902-930 may be utilized as a part of a machine learning process/system to determine how to rank alternative parts within the list of parts 212. Further, not all factors 902-930 may be used to rank the parts—instead, a subset of the factors 902-930 be selected/used as determined based on machine learning and/or user preferences/requirements. As illustrated in FIG. 2, item 214 provides an exemplary list of a set of factors 902-930 that are used in the specified order to rank and recommend a particular alternative part from the list of parts 212: (1) ISO Standards; (2) Organization Inventory; (3) % Usage, cost, and material; and (4) heat, stress, and simulation.

Figure 5:
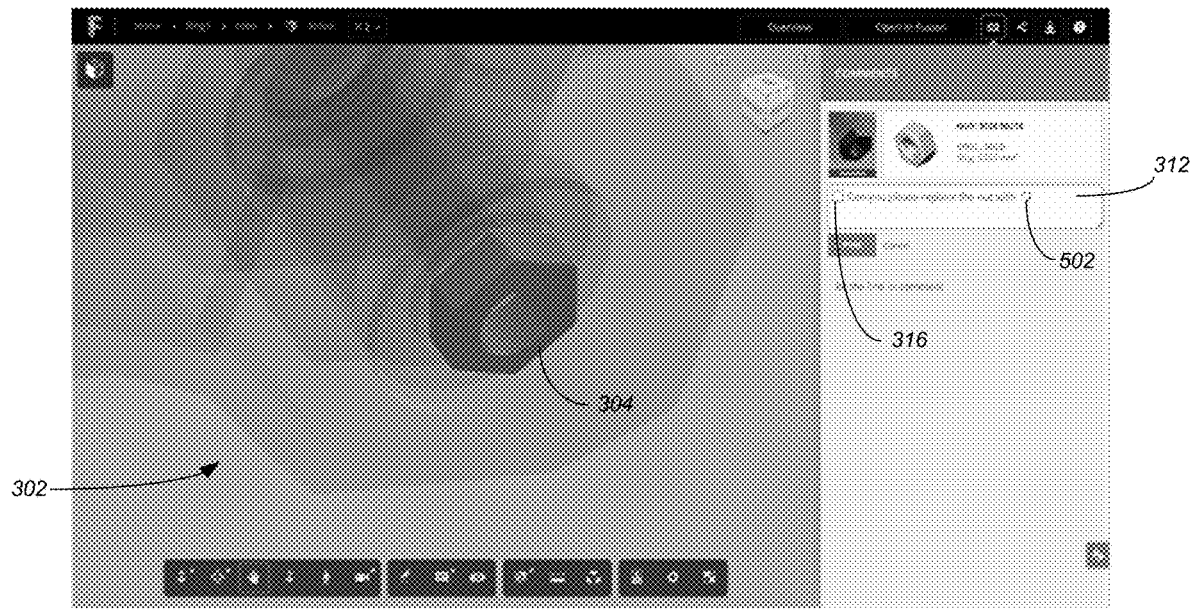
FIG. 5 reflects the dynamic processing in which the system recognizes that the user input may desire to replace the selected part in accordance with one or more embodiments of the invention.

FIG. 5 reflects the dynamic processing in which the system recognizes that the user input may desire to replace the selected part 304. In this regard, the user has input the text comment "Can you please replace the nut with . . . " As the user is inserting the comment the system dynamically parses the text and based on the language "replace" and "with", the system automatically performs an analysis of the user input in an attempt to autocomplete the user's comment. In this regard, the system determines that there is an action to replace the selected part 304, and further initiates the action to provide a recommendation/suggestion to the reviewer regarding potential alternative parts. In this regard, an icon/graphic/GIF image 502 indicates/reflects that processing is being performed. Such processing may include retrieving the list of parts 212 and/or ranking the list of parts 212 in step 214.

Figure 6:
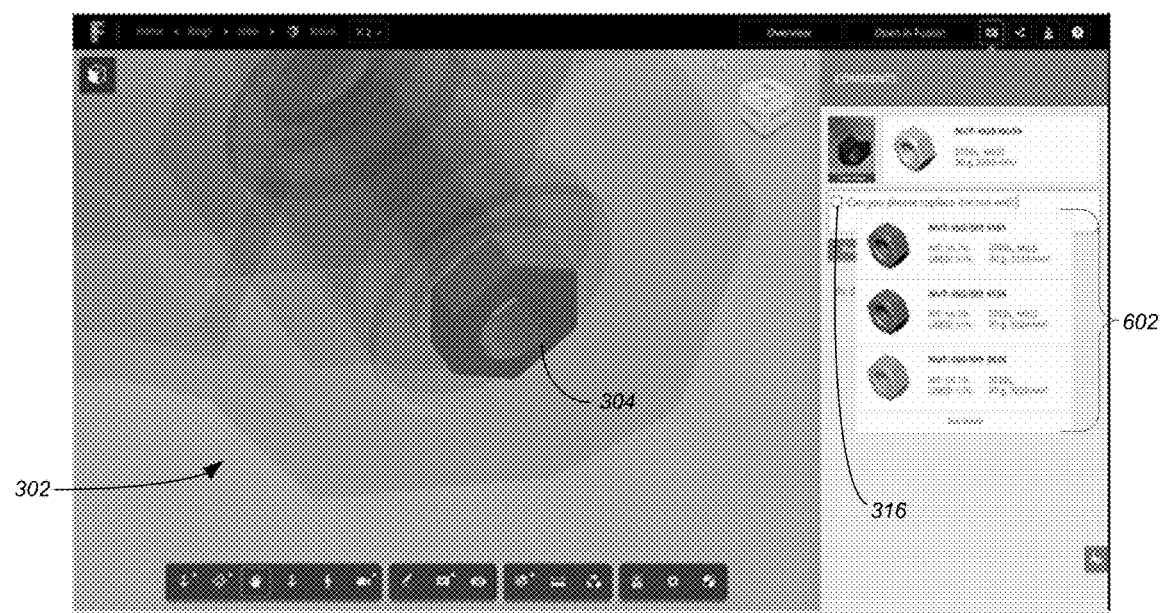
FIG. 6 illustrates a list of ranked recommended/suggested parts that is graphically displayed/presented to the reviewer for selection in accordance with one or more embodiments of the invention.

One or more of the alternative parts may then be dynamically presented/displayed to the user for selection as part of a recommendation (e.g., a graphic representation of one or more of the alternative parts may be dynamically displayed). FIG. 6 illustrates the list of ranked recommended/suggested parts 602 (for replacement of selected part 304) that is graphically displayed/presented to the reviewer for selection. In this regard, as illustrated by FIGS. 5 and 6, the suggestions are dynamically provided inline within and based on the context in which a comment is entered by a reviewer (i.e., the user is not transported to a different search/display window/dialog box).

Figure 7:
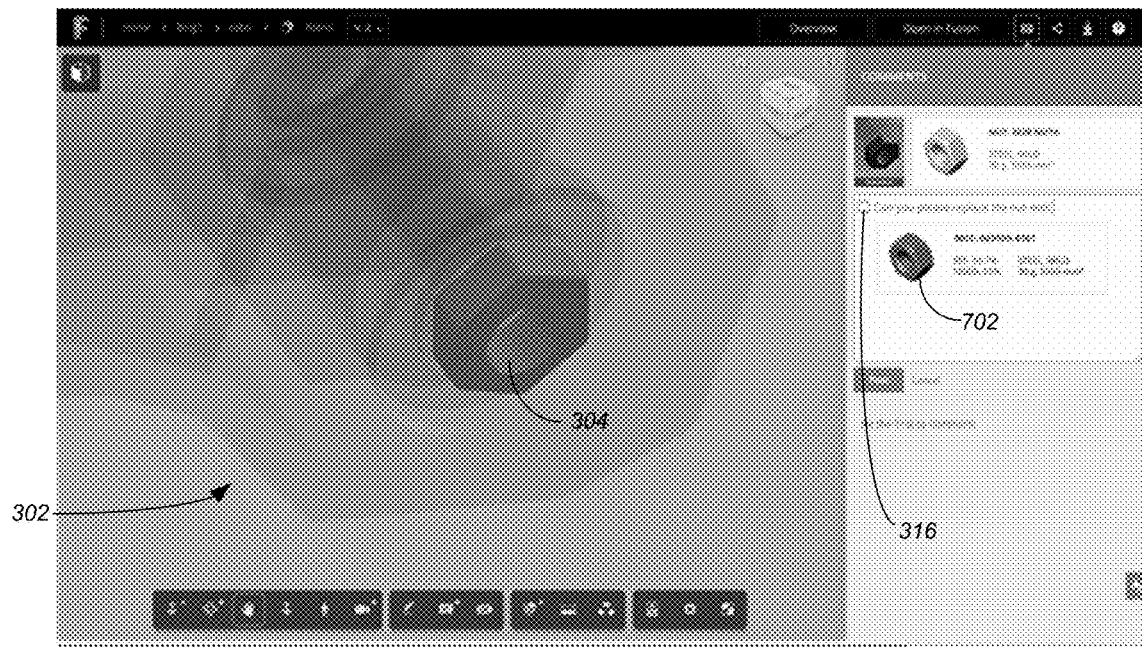
FIG. 7 illustrates a selection of alternative part in accordance with one or more embodiments of the invention.

At step 216, the user/reviewer may then select one of the parts 602 to suggest as a recommended replacement part (via a comment or optional replacement to the designer). FIG. 7 illustrates that alternative part 702 has been selected by the reviewer (e.g., once selected, the remaining parts that were not selected in the recommended list 602 may be removed from the display).

As an optional addition, the user may elect to modify/replace the part within a workflow management tool (such as a product lifecycle management (PLM) system, WORKFLOWMAX, etc.). Such a workflow management tool serves to connect people, processes, and data across a product lifecycle to a central repository (e.g., a database) of information. To activate such a replacement option/capability, the user may elect to select/tick the checkbox 316 at step 218. If the checkbox is not selected/ticked, then the selected alternative part recommendation is posted as a comment at step 220 and the process is complete at step 224. Similarly, if the original text comment entered by the reviewer at step 208 did not call for an action (e.g., to create or modify a part), then the plain text comment is posted as a comment at step 220. In other words, the posted comment is either plain text or may include a selected/proposed replacement part (if outside of the workflow management tool) that is provided to another user (e.g., another collaborator/designer).

Figure 8:
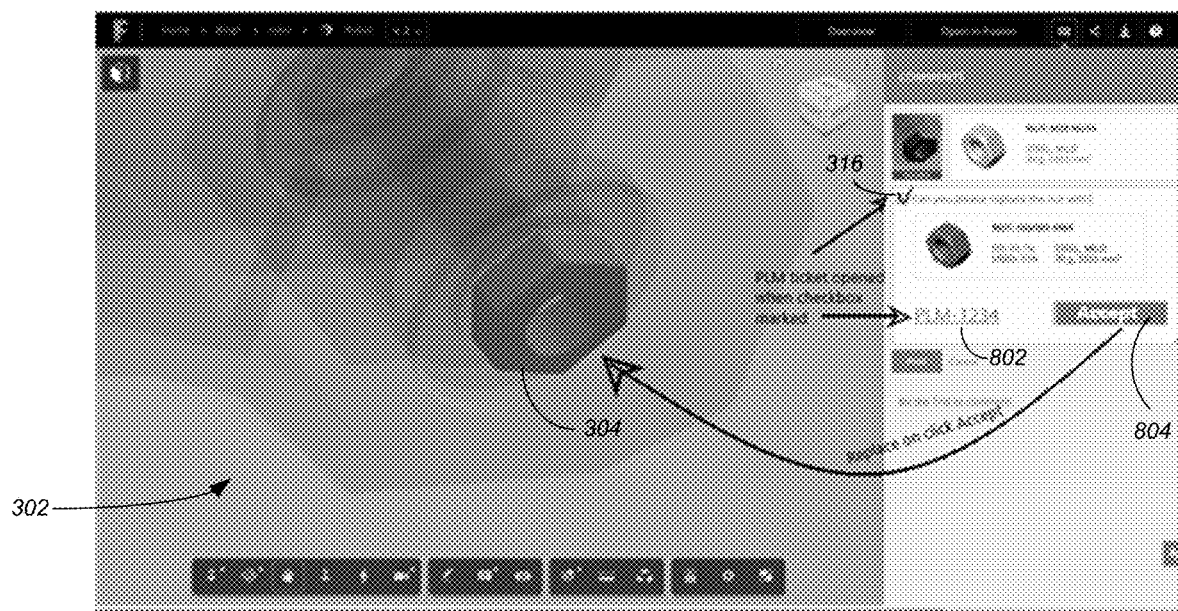
FIG. 8 illustrates a use of a project management workflow in accordance with one or more embodiments of the invention.

If the user opts to participate in/utilize the workflow management tool (i.e., by ticking the checkbox 316 at step 218), the process continues at step 226. Referring to FIG. 8, at step 226, a ticket is created/automatically logged into the tool (and an open ticket number 802 may optionally be displayed to reflect such a ticket creation) and an "accept" button 804 may also be displayed for a collaborating user to select. Such an "accept" button 804 provides the creator/collaborator with the option to accept the changes directly.

At step 228, a determination is made regarding whether the collaborating user selects the "accept" button 804 to accept the replacement of the selected part 304 with the selected alternative part 702. If the creator/collaborating user opts to accept the replacement part at step 228, the selected part 304 is replaced with the selected alternative part 702 in the design 302, the ticket is automatically closed at step 230, and the process is complete at step 224. If the accept button 804 is not selected, the creator/collaborating users may continue to discuss the replacement via commenting (e.g., in the comment section 310 of the design) and closure of the ticket in the workflow management tool may occur manually (e.g., via the collaboration).

Further to the above, embodiments of the invention may also display a live comparison of the changes with the current design, by which the user can estimate the implication of the change.

Hardware Environment

Figure 10:
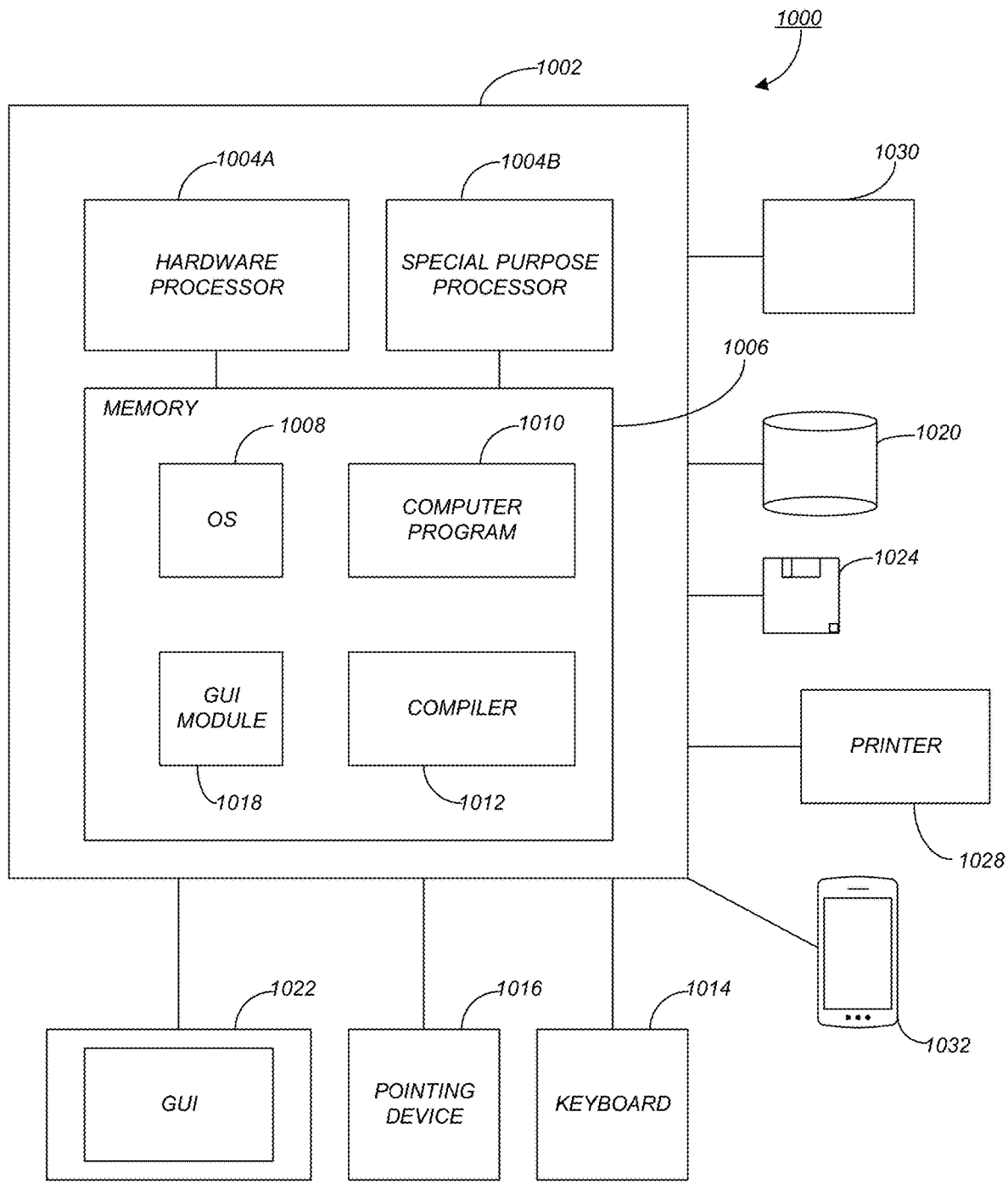
FIG. 10 is an exemplary hardware and software environment used to implement one or more embodiments of the invention.

FIG. 10 is an exemplary hardware and software environment 1000 used to implement one or more embodiments of the invention. The hardware and software environment includes a computer 1002 and may include peripherals. Computer 1002 may be a user/client computer, server computer, or may be a database computer. The computer 1002 comprises a hardware processor 1004A and/or a special purpose hardware processor 1004B (hereinafter alternatively collectively referred to as processor 1004) and a memory 1006, such as random access memory (RAM). The computer 1002 may be coupled to, and/or integrated with, other devices, including input/output (I/O) devices such as a keyboard 1014, a cursor control device 1016 (e.g., a mouse, a pointing device, pen and tablet, touch screen, multi-touch device, etc.) and a printer 1028. In one or more embodiments, computer 1002 may be coupled to, or may comprise, a portable or media viewing/listening device 1032 (e.g., an MP3 player, IPOD, NOOK, portable digital video player, cellular device, personal digital assistant, etc.). In yet another embodiment, the computer 1002 may comprise a multi-touch device, mobile phone, gaming system, internet enabled television, television set top box, or other internet enabled device executing on various platforms and operating systems.

In one embodiment, the computer 1002 operates by the hardware processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008, to provide output and results. The computer program 1010 may consist of/include a machine learning (ML)/artificial intelligence (AI) module and/or design graph (including the smart review system 222 and/or other components of FIG. 2).

Output/results may be presented on the display 1022 or provided to another device for presentation or further processing or action. In one embodiment, the display 1022 comprises a liquid crystal display (LCD) having a plurality of separately addressable liquid crystals. Alternatively, the display 1022 may comprise a light emitting diode (LED) display having clusters of red, green and blue diodes driven together to form full-color pixels. Each liquid crystal or pixel of the display 1022 changes to an opaque or translucent state to form a part of the image on the display in response to the data or information generated by the processor 1004 from the application of the instructions of the computer program 1010 and/or operating system 1008 to the input and commands. The image may be provided through a graphical user interface (GUI) module 1018. Although the GUI module 1018 is depicted as a separate module, the instructions performing the GUI functions can be resident or distributed in the operating system 1008, the computer program 1010, or implemented with special purpose memory and processors.

In one or more embodiments, the display 1022 is integrated with/into the computer 1002 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program 1010 instructions. In one embodiment, the special purpose processor 1004B is an application specific integrated circuit (ASIC).

The computer 1002 may also implement a compiler 1012 that allows an application or computer program 1010 written in a programming language such as C, C++, Assembly, SQL, PYTHON, PROLOG, MATLAB, RUBY, RAILS, HASKELL, or other language to be translated into processor 1004 readable code. Alternatively, the compiler 1012 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1010 accesses and manipulates data accepted from I/O devices and stored in the memory 1006 of the computer 1002 using the relationships and logic that were generated using the compiler 1012.

The computer 1002 also optionally comprises an external communication device such as a modem, satellite link, Ethernet card, or other device for accepting input from, and providing output to, other computers 1002.

In one embodiment, instructions implementing the operating system 1008, the computer program 1010, and the compiler 1012 are tangibly embodied in a non-transitory computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of computer program 1010 instructions which, when accessed, read and executed by the computer 1002, cause the computer 1002 to perform the steps necessary to implement and/or use the present invention or to load the program of instructions into a memory 1006, thus creating a special purpose data structure causing the computer 1002 to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1002.

Figure 11:
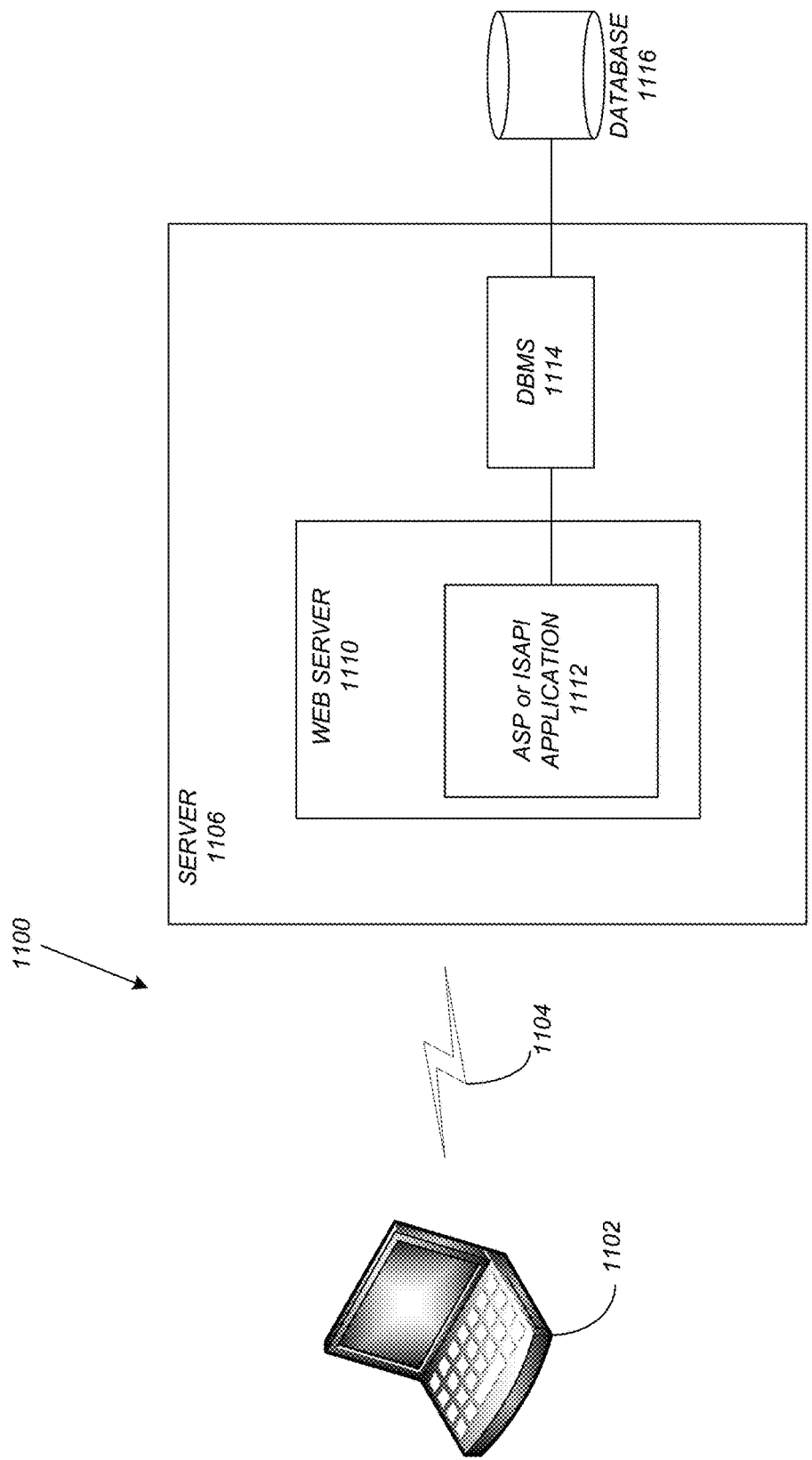
FIG. 11 schematically illustrates a typical distributed/cloud-based computer system using a network to connect client computers to server computers in accordance with one or more embodiments of the invention.

FIG. 11 schematically illustrates a typical distributed/cloud-based computer system 1100 using a network 1104 to connect client computers 1102 to server computers 1106. A typical combination of resources may include a network 1104 comprising the Internet, LANs (local area networks), WANs (wide area networks), SNA (systems network architecture) networks, or the like, clients 1102 that are personal computers or workstations (as set forth in FIG. 10), and servers 1106 that are personal computers, workstations, minicomputers, or mainframes (as set forth in FIG. 10). However, it may be noted that different networks such as a cellular network (e.g., GSM [global system for mobile communications] or otherwise), a satellite based network, or any other type of network may be used to connect clients 1102 and servers 1106 in accordance with embodiments of the invention.

A network 1104 such as the Internet connects clients 1102 to server computers 1106. Network 1104 may utilize ethernet, coaxial cable, wireless communications, radio frequency (RF), etc. to connect and provide the communication between clients 1102 and servers 1106. Further, in a cloud-based computing system, resources (e.g., storage, processors, applications, memory, infrastructure, etc.) in clients 1102 and server computers 1106 may be shared by clients 1102, server computers 1106, and users across one or more networks. Resources may be shared by multiple users and can be dynamically reallocated per demand. In this regard, cloud computing may be referred to as a model for enabling access to a shared pool of configurable computing resources.

Clients 1102 may execute a client application or web browser and communicate with server computers 1106 executing web servers 1110. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1102 may be downloaded from server computer 1106 to client computers 1102 and installed as a plug-in or ACTIVEX control of a web browser. Accordingly, clients 1102 may utilize ACTIVEX components/component object model (COM) or distributed COM (DCOM) components to provide a user interface on a display of client 1102. The web server 1110 is typically a program such as MICROSOFT'S INTERNET INFORMATION SERVER.

Web server 1110 may host an Active Server Page (ASP) or Internet Server Application Programming Interface (ISAPI) application 1112, which may be executing scripts. The scripts invoke objects that execute business logic (referred to as business objects). The business objects then manipulate data in database 1116 through a database management system (DBMS) 1114. Alternatively, database 1116 may be part of, or connected directly to, client 1102 instead of communicating/obtaining the information from database 1116 across network 1104. When a developer encapsulates the business functionality into objects, the system may be referred to as a component object model (COM) system. Accordingly, the scripts executing on web server 1110 (and/or application 1112) invoke COM objects that implement the business logic. Further, server 1106 may utilize MICROSOFT'S TRANSACTION SERVER (MTS) to access required data stored in database 1116 via an interface such as ADO (Active Data Objects), OLE DB (Object Linking and Embedding DataBase), or ODBC (Open DataBase Connectivity).

Generally, these components 1100-1116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1102 and 1106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1102 and 1106. Thus, embodiments of the invention are implemented as a software application on a client 1102 or server computer 1106. Further, as described above, the client 1102 or server computer 1106 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for enabling multi-user collaboration on a three-dimensional (3D) design, comprising:
   (a) acquiring the 3D design in a computer-aided design (CAD) application;
   (b) activating a commenting process for a comment to be associated with a selected part of the 3D design;
   (c) dynamically processing user input for the comment as it is received, wherein:
      (i) the user input comprises text;
      (ii) the dynamically processing recognizes that the text relates to creating or modifying the selected part; and
      (iii) the dynamically processing dynamically retrieves a list of one or more alternative parts, wherein the list is based on similarities between the one or more alternative parts and the selected part;
   (d) providing, via a graphical user interface for the comment, a selectable option to either:
      (i) post a first alternative part of the one or more alternative parts as a text comment; or
      (ii) propose, within the comment, the first alternative part as a direct replacement part;
   (f) providing the comment based on the selectable option to another user.

2. The computer-implemented method of claim 1, wherein the dynamically processing utilizes a natural language processor (NLP) to interpret the text.

3. The computer-implemented method of claim 1, wherein the one or more alternative parts are determined based on machine learning.

4. The computer-implemented method of claim 3, further comprising:
   ranking the list of one or more alternative parts based on the machine learning.

5. The computer-implemented method of claim 4, wherein the ranking is based on:
   a confidence of a similarity between geometries of the selected part and each of the one or more alternative parts;
   a fit comprising an extent to which each of the one or more alternative parts will fit in the 3D design;
   an amount of usage of each of the one or more alternative parts;
   simulation results for the one or more alternative parts comprising a stress factor, a bend factor, and a heat factor;
   inventory data comprising a cost for each of the alternative one or more parts and whether each of the one or more alternative parts is in stock;
   a material of each of the one or more alternative parts; and
   a color of each of the one or more alternative parts.

6. The computer-implemented method of claim 4, wherein the ranking is based on:
   organization inventory.

7. The computer-implemented method of claim 4, wherein the ranking is based on:
   percentage usage, cost, and material.

8. The computer-implemented method of claim 1, further comprising:
   activating the option to propose the first alternative part as a direct replacement part, wherein the activating is conducted within a product lifecycle management (PLM) system, wherein the PLM system connects people, processes, and data across a product lifecycle to a central repository of information;
   based on activating the option, creating a ticket in the PLM system;
   displaying an accept selection option for a collaborating user to directly replace the selected part with the first alternative part;
   receiving activation of the accept selection option from the collaborating user;
   directly replacing the selected part with the first alternative part within the PLM system; and closing the ticket in the PLM system.

9. A computer-implemented system for enabling multi-user collaboration on a three-dimensional (3D) design, comprising:
(a) a computer having a memory;
(b) a processor executing on the computer;
(c) a computer-aided design (CAD) application executed by the processor, wherein the CAD application:
(1) acquires the 3D design;
(2) activates a commenting process for a comment to be associated with a selected part of the 3D design;
(3) dynamically processes user input for the comment as it is received, wherein:
(i) the user input comprises text;
(ii) the dynamic processing recognizes that the text relates to creating or modifying the selected part; and
(iii) the dynamic processing dynamically retrieves a list of one or more alternative parts, wherein the list is based on similarities between the one or more alternative parts and the selected part;
(4) provide, via a graphical user interface for the comment, a selectable option to either:
(i) post a first alternative part of the one or more alternative parts as a text comment; or
(ii) propose, within the comment, the first alternative part as a direct replacement part; and
(5) provides the comment based on the selectable option to another user.

10. The computer-implemented system of claim 9, wherein the dynamic processing utilizes a natural language processor (NLP) to interpret the text.

11. The computer-implemented system of claim 9, wherein the CAD application:
determines the list of one or more alternative parts based on machine learning.

12. The computer-implemented system of claim 11, wherein the CAD application:
ranks the list of one or more alternative parts based on the machine learning.

13. The computer-implemented system of claim 12, wherein the ranking is based on:
a confidence of a similarity between geometries of the selected part and each of the one or more alternative parts;
a fit comprising an extent to which each of the one or more alternative parts will fit in the 3D design;
an amount of usage of each of the one or more alternative parts;
simulation results for the one or more alternative parts comprising a stress factor, a bend factor, and a heat factor;
inventory data comprising a cost for each of the alternative one or more parts and whether each of the one or more alternative parts is in stock;
a material of each of the one or more alternative parts; and
a color of each of the one or more alternative parts.

14. The computer-implemented system of claim 12, wherein the ranking is based on:
organization inventory.

15. The computer-implemented system of claim 12, wherein the ranking is based on:
percentage usage, cost, and material.

16. The computer-implemented system of claim 9, wherein the CAD application further comprises:
activating the option to propose the first alternative part as a direct replacement part, wherein the activating is conducted within a product lifecycle management (PLM) system, wherein the PLM system connects people, processes, and data across a product lifecycle to a central repository of information;
based on activating the option, creating a ticket in the PLM system;
displaying an accept selection option for a collaborating user to directly replace the selected part with the first alternative part;
receiving activation of the accept selection option from the collaborating user;
directly replacing the selected part with the first alternative part within the PLM system; and
closing the ticket in the PLM system.

* * * * *